Aug. 18, 1953 F. E. RADCLIFFE 2,649,570
TEST EQUIPMENT AND METHOD FOR MEASURING
REFLECTION COEFFICIENT
Filed June 29, 1950 4 Sheets-Sheet 1

INVENTOR
F. E. RADCLIFFE
BY
ATTORNEY

Aug. 18, 1953   F. E. RADCLIFFE   2,649,570
TEST EQUIPMENT AND METHOD FOR MEASURING
REFLECTION COEFFICIENT
Filed June 29, 1950   4 Sheets-Sheet 2

INVENTOR
F. E. RADCLIFFE
BY
H. A. Burgers
ATTORNEY

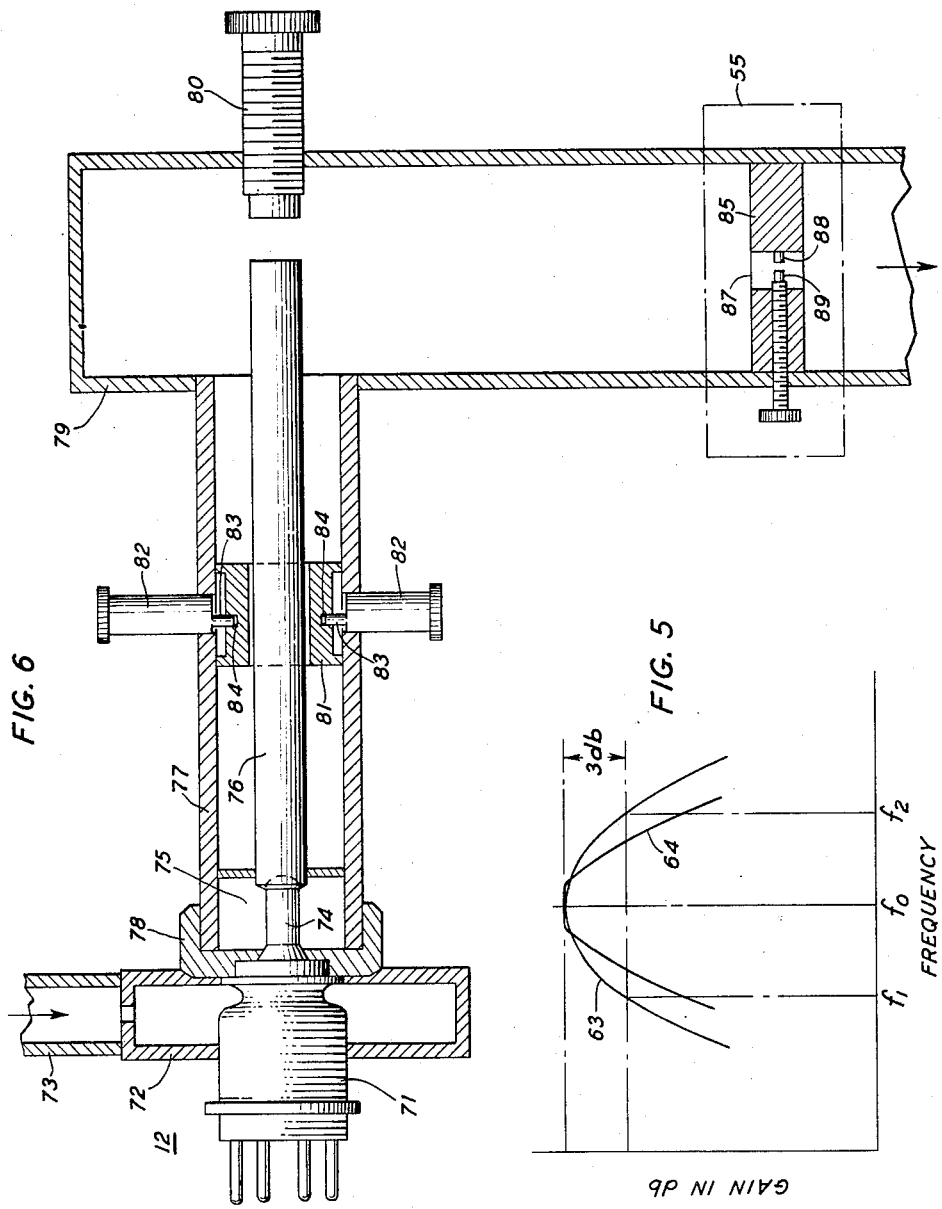

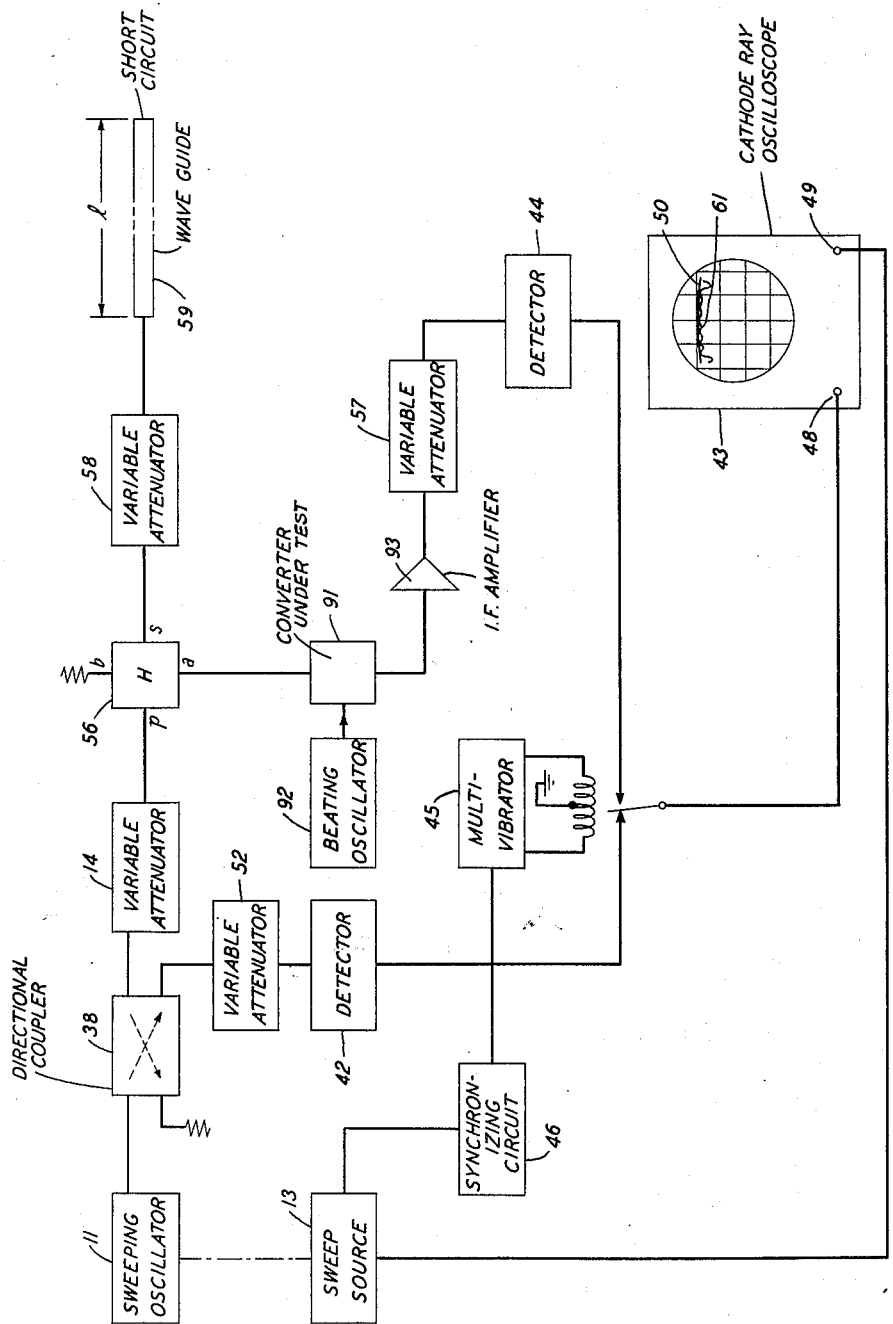

Patented Aug. 18, 1953

2,649,570

UNITED STATES PATENT OFFICE 2,649,570

TEST EQUIPMENT AND METHOD FOR MEASURING REFLECTION COEFFICIENT

Frederick E. Radcliffe, Chatham, N. J., assignor to Bell Telephone Laboratories, Incorporated, New York, N. Y., a corporation of New York Application June 29, 1950, Serial No. 171,057

24 Claims. (Cl. 324—57)

This invention relates to high frequency testing apparatus and methods and more particularly to methods and apparatus for determining the impedance mismatch and transmission characteristics of high frequency devices.

It is an object of this invention to accurately determine the impedance mismatch of a high frequency device.

It is also an object of the invention to accurately determine the return loss of the output of an amplifier and, more specifically, the impedance mismatch of the output of an amplifier whose output impedance is a function of the power delivered.

A further object of the invention is to accurately determine the impedance mismatch of devices to which only relatively small amounts of power can be delivered.

A more specific object of the invention is to provide a testing method and apparatus for quickly and accurately determining the return loss of microwave apparatus.

Another object of the invention is to provide a testing method and apparatus for determining both the transmission characteristic and impedance mismatch of a high frequency device and more specifically a method and apparatus for simultaneously making both determinations.

Cross-talk in multichannel radio relay systems has been found to arise from small amounts of impedance mismatch in the outputs of final amplifier stages. The final amplifiers at the relay stations are ordinarily coupled to the transmitting antennas by sections of transmission line which may be on the order of a hundred feet long. Due to mismatch of the antenna to the line, a portion of the incident energy will be reflected from the antenna back over the transmission line. Due to mismatch of the final amplifier output, a portion of the energy reflected from the antenna will be re-reflected from the amplifier output and repass over the connecting line to the antenna. If the signals being transmitted are frequency modulated, the varying phase shift of the doubly-reflected energy will result in cross-talk between channels which may substantially decrease the quality of the system even though the net return loss of the antenna and the final amplifier is high. It is therefore desirable to discover and correct even small amounts of impedance mismatch in the outputs of the final amplifiers.

There are known in the art methods comprising the use of directional couplers for determining the standing wave ratio on a transmission line and hence the return loss of the terminating device. A directional coupler is interposed between the device under test and a source of energy; by virtue of the directional properties of the coupler, a sample of the direct energy may readily be compared with a sample of the reflected energy and their relative amplitudes determined.

Methods are also known which comprise applying a signal swept in frequency to the device under test over a long section of transmission line. Due to the length of the line and the rate at which the frequency of the applied signal is varied, the frequency of the source will have changed by the time the reflected energy returns to the source. The amplitude of the detected beat note at the source is an indication of the return loss of the device being tested.

In frequency modulation systems it is not necessary to employ perfectly linear amplifiers and, in fact, it is customary to operate even those amplifiers having at least a portion of their characteristic linear on the curved portion of the characteristic for maximum power output. Due to this compression in the amplifier characteristic, which is particularly evident in microwave triodes, the output impedance of the tube varies with the amount of power delivered. It therefore becomes necessary in order to determine small amounts of output mismatch to have the tube delivering its normal power during the test. Prior art methods of determining amplifier output return loss which comprise applying a normal level signal to the input of the amplifier and an auxiliary or test signal directly to the output of the amplifier have been found to be generally unsatisfactory since the amplifier output tends both to overload the test equipment and also to mask the energy reflected from the amplifier output.

In accordance with an illustrative embodiment of the invention which will be described below in detail, a portion of the tube output is made the test signal by reflecting it from an electrically long transmission line which is terminated at one end by a known impedance mismatch back to the output of the amplifier. The applied signal is swept in frequency over a range including the pass band of the amplifier so that the phase shift of the reflected energy is continually varying and so that the impedance match of the amplifier output may be determined over the entire pass band of the amplifier. The energy reflected from the output of the amplifier combines with the direct output of the tube to cause ripples on the latter. The ripples are detected and viewed on an oscilloscope so that their amplitude, which is a function of the return loss of the amplifier, may be measured. The gain-frequency characteristic of the amplifier under test may also readily be checked by the same apparatus employed to determine the output return loss. It is necessary only to introduce sufficient attenuation in the path of the reflected energy so that the ripples on the test trace are removed. In the usual case, the transmission characteristic of the amplifier is first checked and adjusted for flatness. The ripples are then brought back on the test trace and further adjustments to improve the output impedance match and reduce the ripple amplitude are made.

In another embodiment, also to be described in detail below, the methods in accordance with the invention are adaptable to accurately determine the input return loss of devices, such as balanced converters, which require a relatively low power input. When testing the input mismatch of a converter, a portion of the reflected input signal is applied to a short-circuited section of transmission line and from there reflected back to the input of the converter. The ripples are detected at the output of the converter so that intermediate frequency amplifiers may be used to amplify the test signals.

The double reflection method of determining either input or output mismatch, as taught by the present invention, is particularly useful at microwave frequencies since the short-circuited transmission line, which may for example, be a section of hollow metallic wave guide, must be at least several wave lengths long to give an appreciable number of of $2\pi$ phase shifts, and hence ripples, over the pass band of the device under test. Also, the greater the bandwidth, the shorter the transmission line section since the applied signal is swept over the entire pass band of the device being tested to determine the match over the entire band.

The return loss of a device is defined herein as the difference in power levels, on a decibel scale, of the incident and reflected energy, or:

$$W = 10 \log_{10} \frac{P_i}{P_r} \qquad (1)$$

where, $W$=the return loss, in decibels,
$P_i$=the incident power, and,
$P_r$=the reflected power.

In terms of reflection coefficient:

$$W = 20 \log_{10} \frac{1}{\rho} \qquad (2)$$

where $\rho$=the reflection coefficient and is equal to:

$$\rho = \frac{\frac{Z_l}{Z_0} - 1}{\frac{Z_l}{Z_0} + 1} \qquad (3)$$

where, $Z_l$=the impedance of the device "looking in" from the connecting transmission line, and,
$Z_0$=the characteristic impedance of the transmission line.

The standing wave ratio is the ratio of the maximum standing wave voltage to the minimum standing wave voltage, i. e., $$S = \frac{E_s \text{ max.}}{E_s \text{ min.}} \qquad (4)$$

where, $S$=the standing wave ratio,
$E_s$ max.=the maximum voltage along the standing wave, and
$E_s$ min.=the minimum voltage along the standing wave.

Other features and principles of the invention may be better understood by a consideration of the following detailed description when read in accordance with the following drawings, in which:

Fig. 3 is a vector diagram illustrative of the circuit of Fig. 1;

Fig. 5 shows curves illustrative of Fig. 1;

Fig. 6 shows, diagrammatically, a microwave amplifier together with associated output circuits; and Fig. 7 illustrates by block diagram how principles of the invention may be employed to determine the input return loss of a radio frequency device.

Figure 1:
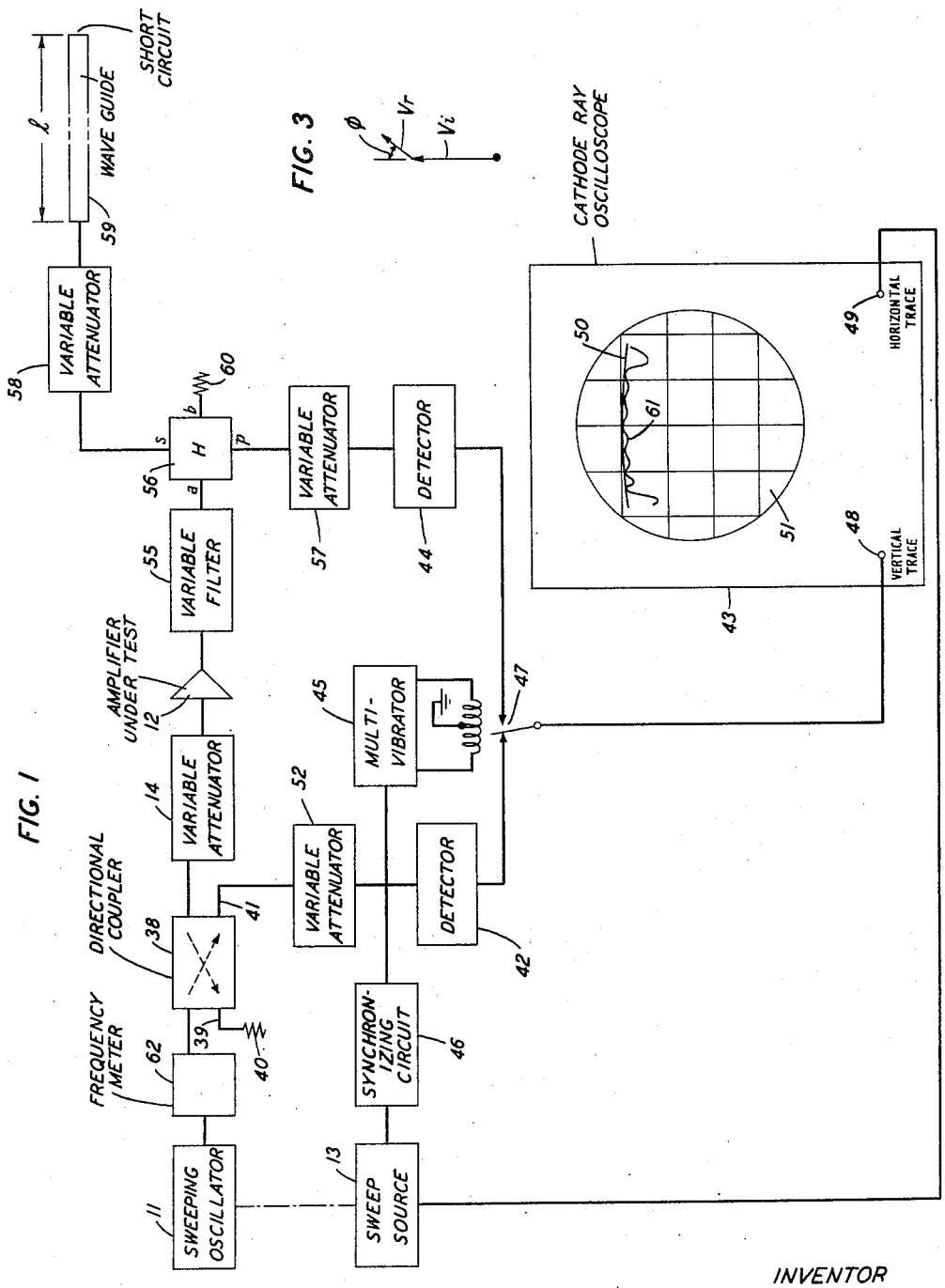
Fig. 1 shows, by block diagram, partially diagrammatic, a circuit arrangement for determining the output return loss of an amplifier in accordance with the present invention.

The output return loss, and hence impedance mismatch of an amplifier may be determined in accordance with the method now to be described. Referring now to Fig. 1, an oscillator 11, whose output frequency is swept over a range including the pass band of the amplifier 12 under test by the sweep source 13, supplies power to the amplifier 12 whose output return loss is to be determined. Variable attenuator 14 controls the amount of power delivered to the amplifier 12.

Figure 2:
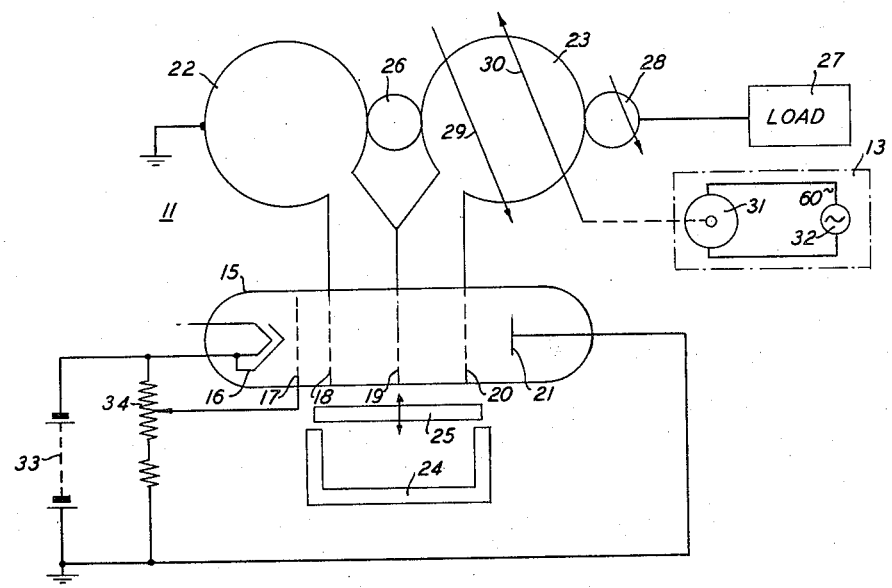
Fig. 2 shows, schematically, a radio frequency swept oscillator which may be used in the circuit of Fig. 1.

A microwave frequency swept oscillator is shown by way of example in Fig. 2. The oscillator comprises a two cavity velocity variation tube 15 having an indirectly heated cathode 16, an accelerating grid 17, three disc members 18, 19 and 20, each having a centrally located hole, and a collector 21. A battery 33 biases the collector electrode 21 positive with respect to the cathode 16 and also supplies a positive biasing voltage to the accelerating grid 17 by means of potentiometer 34. The positive terminal of battery 33 and the cavities 22 and 23 are grounded so that the full potential of battery 33, on the order of 1500 volts, is applied between the discs 18, 19 and 20 and cathode 16. The accelerating grid 17 is biased on the order of 200 to 500 volts positive with respect to the cathode 16. The input cavity 22 is connected to the first two discs 18 and 19 and the output cavity 23 is connected to discs 19 and 20. A magnet 24, whose effect is controlled by a variable magnetic shunt 25, focuses the electron stream emitted by the electron gun assembly comprising the cathode 16 and grid 17 so that it passes through the holes in the discs 18. If an alternating voltage is applied between discs 18 and 19 by the input cavity 22, the electrons of the stream will be bunched in their passage through discs 18 and 19. These bunches of electrons excite the output cavity 23 which is tuned to the same frequency as the input cavity. A portion of the energy in the output cavity 23 is fed back to the input cavity 22 through a coupling hole 26 to provide the alternating voltage which causes the bunching and to cause the tube to oscillate. Energy is coupled to a load circuit 27 through a tunable iris 28 in the output cavity.

Two controls 29 and 30 are provided to vary the output frequency of the oscillator. Control 29 is provided to vary the center frequency of the output energy and may, for example, comprise a pair of plungers which vary the volume of the output cavity 23. Control 30 is provided to sweep the output frequency over the desired range and may, for example, comprise a rod of insulating material such as polystyrene having diametrically opposed 90° segments of conducting material longitudinally disposed along the axis of the rod. A synchronous motor 31, mechanically coupled to the rod, rotates the rod within the cavity and causes the output frequency to vary in an approximately sinusoidal manner. Inserting the rod further into the cavity makes its effect greater so that the frequency is swept over a wider range. The motor 31 is energized by a 60-cycle power source 32 and rotates at 1800 R. P. M., causing the frequency to change from low to high and return twice per revolution. 3600 complete sweeps per minute or 60 per second are thus produced.

Referring again to Fig. 1, a sample of the swept signal is obtained by the directional coupler 38; the dotted arrows in the drawing indicate the directions of coupling for the direct and reflected energy. The directional coupler 38 may, for example, be of the type described in an article by W. W. Mumford entitled "Directional Couplers" which appears in the Proceedings of the IRE, volume 35, pp. 160–165, February 1947. The arm 39 of the coupler which couples the reflected energy is terminated in its characteristic impedance by the impedance 40, while the arm 41 which couples the direct energy is connected by way of variable attenuator 52 to detector 42. The output of detector 42 provides the vertical trace for the cathode ray oscilloscope 43 alternately with the output of detector 44. A 30-cycle multivibrator 45, synchronized with the sweep source 13 by the synchronizing circuit 46 is provided to operate relay 47 and alternately connect the outputs of detectors 42 and 44 to terminal 48 of the oscilloscope which is connected to the vertical deflection plates of the oscilloscope. A 60-cycle horizontal sweeping voltage for the oscilloscope terminal 49 is derived from sweep source 13. The output of detector 42 provides a reference trace 50 on the viewing face 51 of the oscilloscope 43.

The output of amplifier 12 is passed through a tunable filter 55, whose utility will be discussed below, to the $a$ arm of a hybrid wave guide junction 56. A wave guide hybrid junction is disclosed, for example, in Patent 2,445,895 dated July 27, 1948 to W. A. Tyrrell and comprises a main wave guide having arms $a$ and $b$, a series arm $s$ joined in the electrical plane of the main guide, and a parallel arm $p$ joined in the magnetic plane. The $a$ and $b$, and $s$ and $p$ arms are, respectively, in a balanced relation so that there will be no direct interchange of energy between either the $a$ and $b$ arms, or between the $s$ and $p$ arms. Energy entering the $a$ arm will therefore divide between the $s$ and $p$ arms, one half flowing through the variable attenuator 57 to detector 44 and the other half through variable attenuator 58 to a short circuited section of hollow metallic wave guide 59.

The wave guide section 59 has a length $l$ which is at least several wave lengths long over the frequency range of the applied signal and will reflect incident energy back through attenuator 58 to hybrid junction 56. Energy entering the $s$ arm of the hybrid junction will divide between the $a$ and $b$ arms, the latter arm being terminated in its characteristic impedance by impedance 60. Energy reflected from the short-circuited wave guide 59 will not appear in the $p$ arm of hybrid junction 56 due to the balance between the $p$ and $s$ arms. The reflected energy entering the $a$ arm from the $s$ arm will be reflected from the output of the amplifier 12 in an amount depending on the return loss of the amplifier 12 output. The doubly reflected energy will return to hybrid junction 56 where it will again divide between the $p$ and $s$ arms.

The doubly reflected energy leaving the $p$ arm of hybrid junction 56 will combine with the non-reflected energy which has passed only through amplifier 12 and the $p$ arm of the hybrid. The energy appearing in the $p$ arm may be expressed vectorially as shown in Fig. 3 where vector $V_i$ represents the incident non-reflected energy and vector $V_r$ represents the doubly reflected energy.

The level of the reflected voltage $V_r$ in arm $p$ of the hybrid junction is down from the non-reflected sweeping voltage $V_i$ by an amount:

$$W_T = W_a + 2(3 + L_{58} + L_{59}) \quad (5)$$

where, $W_T$ = the level difference of voltages $V_i$ and $V_r$, in decibels, $W_a$ = the return loss of the amplifier 12 output, in decibels, $L_{58}$ = the loss of attenuator 58, in decibels, $L_{59}$ = the loss of the line 59, in decibels, and, 3 = the loss in decibels resulting from the division of energy in hybrid junction 56.

The phase angle $\varphi$ between the vectors $V_r$ and $V_i$ will depend primarily on the length of the wave guide section 59 and the instantaneous frequency of the applied signal. As the frequency varies, the angle $\varphi$ will vary so that, in effect, the vector $V_r$ will rotate about the end of vector $V_i$; it is this effect which produces ripples in the voltage appearing in the $p$ arm of hybrid junction 56.

It should be noted that the rate at which the frequency of oscillator 11 is swept and the length of line 59 are such that the frequency of the direct energy entering the $p$ arm of hybrid junction 56 will not have changed appreciably by the time the doubly reflected energy enters the same arm so that the instantaneous frequencies of $V_r$ and $V_i$ in the $p$ arm of the hybrid are substantially equal.

The ripples are detected by detector 44 and provide the vertical trace for the oscilloscope 43 alternately with the output of detector 42 as previously mentioned and produce the test trace 61 on the face of the oscilloscope. Blanking voltages may be applied to the oscilloscope in any well known manner to prevent the return traces from obscuring the pattern.

Whereas the ripple periodicity is primarily a function of the length of line 59, the ripple amplitude is a measure of the level difference between the incident and reflected energy and shows the standing wave existing in the $p$ arm of hybrid junction 56. Although the standing wave ratio is technically a ratio of voltages, it becomes convenient to express it in decibels by the conversion:

$$S_{db} = 20 \log_{10} S \quad (6)$$

where $S_{db}$ = the standing wave ratio expressed in decibels. Since the standing wave ratio may be expressed in terms of incident and reflected voltage as:

$$S = \frac{V_i + V_r}{V_i - V_r} \quad (7)$$

and, since the level difference in decibels is:

$$W_T = 20 \log_{10} \frac{V_i}{V_r} \quad (8)$$

the level difference may be expressed in terms of standing wave ratio:

$$W_T = 20 \log_{10} \frac{S+1}{S-1} \quad (9)$$

Figure 4:
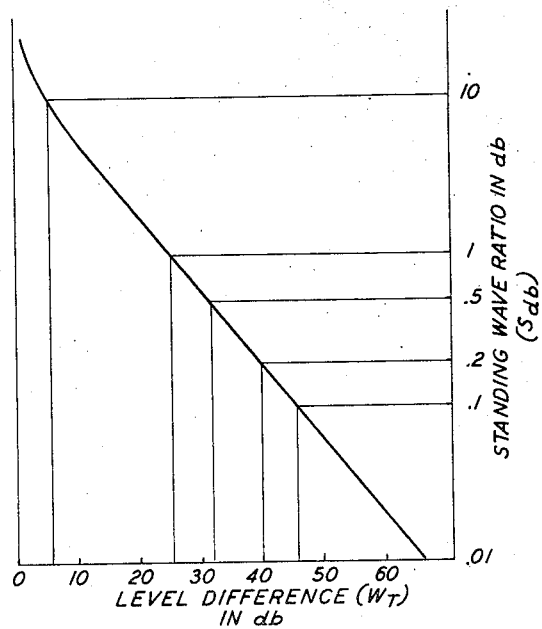
Fig. 4 is a graph showing the relation between standing wave ratio and level difference.

A graph of the relation expressed by Equation 9 with both standing wave ratio and level difference in decibels, and with the standing wave ratio on a logarithmic scale, is shown in Fig. 4; illustrative values are indicated on the drawing. Therefore, if the standing wave ratio is known, the level difference may be obtained and, from Equation 5, the return loss of the amplifier output will equal:

$$W_a = W_T - 2(3 + L_{58} + L_{59}) \quad (10)$$

Since the loss of the wave guide section 59 can easily be determined, attenuator 58 may be adjusted to give the quantity $2(3+L_{58}+L_{59})$ a convenient value.

The standing wave ratio in decibels may be read directly from the face of the oscilloscope by calibrating the latter to read directly in decibels. For example, to make one inch of vertical deflection equal to one decibel, increase the loss of attenuator 58 sufficiently to remove the ripple from test trace 61; adjust either attenuator 14 or 57 to make the traces 50 and 61 coincide; then, increase the loss of either attenuator 57 or attenuator 52 by one decibel and adjust the vertical sweep gain of the oscilloscope 43 to separate the traces by one inch; when attenuator 57 or 52 is returned to its original setting, the traces will again coincide and the vertical sensitivity will equal one decibel per inch. It should be noted that when the loss of attenuator 58 is adjusted to a high value so that the ripple is removed from the test trace 61, the oscilloscope shows the gain v. frequency characteristic of amplifier 12 so that the amplifier transmission characteristic may be checked for flatness. A frequency meter 62 may be used to check the width of the amplifier pass band and to calibrate the horizontal deflection of the oscilloscope. Attenuator 58 is returned to its predetermined value discussed above before a determination of the amplifier output return loss is made. By calibrating the oscilloscope as just described, the standing wave ratio in decibels may be read directly from the face of the oscilloscope by measuring the amplitude of the ripples on the test trace 61. It may also be noted that if the ripples have a relatively small amplitude, the test trace 61 will give a good indication of the transmission characteristic simultaneously with a quantitative indication of the output return loss of the amplifier.

By way of illustration, in one embodiment of the invention which was employed to determine the return loss of the output of a microwave amplifier having a flat gain characteristic over approximately 20 megacycles at 4000 megacycles, it was predetermined that the output return loss should be more than about 30 decibels. A 50 foot section of hollow pipe rectangular wave guide was employed as the reflecting line 59 and gave approximately six ripples on the oscilloscope over the flat portion of the characteristic. Further, attenuator 58 was adjusted to make the quantity $2(3+L_{58}+L_{59})$ equal to 15 decibels so that a level difference of 45 decibels, equal to a standing wave ratio of .1 decibel, would equal an output return loss of 30 decibels. By calibrating the vertical sensitivity of the oscilloscope to equal one decibel per inch, it was necessary only to ascertain that the ripple amplitude, peak-to-peak, was less than one tenth of an inch to know that the return loss of the amplifier was above the minimum allowable.

If the amplifier 12 and associated circuits have the gain v. frequency characteristic of a single tuned circuit such as curve 63 in Fig. 5, the amplifier output is matched at only one frequency, viz. $f_0$. The gain-frequency characteristic may be flattened by adding in series with the amplifier output an appropriately spaced single tuned filter, filter 55 in Fig. 1, having the same Q as the amplifier, where:

$$Q = \frac{f_0}{f_2 - f_1} \quad (11)$$

where $f_0$ = the frequency at the peak of the resonance curve, and, $f_1$ and $f_2$ = respectively, the frequencies at the 3 decibel down points.

The over-all characteristic of the amplifier and filter will appear as curve 64 in Fig. 5 and will be flat within 0.1 decibel over a frequency range equal roughly to one-fourth the pass band of the single tuned circuit, the pass band being the frequency separation of the 3-decibel down points, and will have a pass band equal to approximately seven-tenths of the pass band of the single tuned circuit. Also, the combined amplifier-filter will present substantially a constant impedance match to its output over the flat portion of the characteristic. For a more detailed discussion, reference may be made to an article by W. W. Mumford entitled "Maximally-flat filters in wave guides" which appears in the Bell System Technical Journal, vol. XXVII, No. 4, October 1948, at page 684.

Means may also be provided to vary the tuning of the amplifier output, the tuning of the filter and the coupling between the two so as to improve the over-all output impedance match. Referring now to Fig. 6, a microwave triode 71 of the type disclosed in Patent 2,527,127, of R. S. Gormley, Charles Maggs and L. F. Moose, dated October 24, 1950 has energy supplied to an input cavity 72 by a wave guide 73. The anode 74 of the tube projects into an output cavity 75 and is both mechanically and electrically coupled to the center conductor 76 of a section of 50-ohm coaxial line having an outer conductor 77 fitted into a sleeve member 78 which surrounds the tube 71 and forms one wall of the output cavity 75. The center conductor 76 extends into an output wave guide 79 and acts as a coaxial-to-wave guide transducer, being properly positioned and proportioned to match the coaxial line to the wave guide. The screw member 80, in effect, capacitively loads the end of the conductor 76 and is provided to vary the coupling to the wave guide 79.

The output impedance of a typical tube of the type shown, which is commercially designated the Western Electric 416A, is on the order of 5000 ohms. To match the 5000-ohm tube output to the 50-ohm line, there is provided a quarter-wave transformer comprising the slidable ring member 81 which makes contact with the outer conductor 77 at either end. Two diametrically opposed and eccentrically mounted rotatable members 82 have a pin member 83 fitted into a slot 84 in the ring member 81 and provide means for adjusting the position of the transformer 81 along the axis of the coaxial line. These are necessary since the edge of the quarter-wave transformer nearest the anode 74 must be positioned at a point of approximately pure resistance, looking into the tube output, and since this point will change with varying frequency. The impedance of the transformer 81, equal to the geometric means of the maximum and minimum levels of the standing wave on the coaxial line, is determined by the size of the ring member, and primarily its inner diameter as compared to the diameter of the center conductor 76.

The filter 55 of Fig. 1 which is added to improve the output characteristic of amplifier 12 is a resonant iris structure comprising the metallic plate 85 having a centrally located hole 87, a radial pin 88, and an adjustable pin 89 for tuning. A filter of this general type is disclosed in a book by G. L. Ragan entitled "Microwave Transmission Circuits," McGraw-Hill, 1948 (Radiation Laboratory Series, vol. 9) at page 690 and has the characteristic of a single tuned circuit.

If the test trace on the oscilloscope is symmetrical about the center of the band with either larger or smaller ripples over the center of the trace, the logical adjustment is to vary screw 80 and adjust the coupling between the amplifier 12 and filter 55; with small ripples over the center of the band, the filter is over coupled, with large center ripples, it is undercoupled. If the test trace is not symmetrical, the proper adjustment, logically, is either the screw member 89 or the eccentric members 82, which vary respectively, the tuning of the filter and the output tuning of the amplifier. In a practical case, adjustment of all three controls will generally be necessary to reduce the ripples below the maximum allowable over the entire band.

Referring now to Fig. 7 the circuit shown includes sufficient sensitivity to measure the input impedance of a balanced microwave converter 91 at the signal frequency even though the signal level is low relative to the level of the beating oscillator 92. A portion of the sweeping voltage is sampled by directional coupler 38, detected by detector 42 and applied to the vertical deflection plates of the oscilloscope 43, alternately with the output of detector 44, to provide the reference trace 50 as described in connection with Fig. 1. The sweeping incident voltage divides between the terminated *b* arm and the *a* arm of hybrid junction 56 so that half of the incident energy is applied to the input of converter 91.

Due to input impedance mismatch of the converter, a portion of the incident energy is reflected therefrom and is divided between the *p* and *s* arms of the hybrid junction 56. The reflected energy flowing through the *s* arm is reflected from the short circuited wave guide section 59 and after dividing between the *a* and *b* arms of the hybrid junction 56, a portion of the now doubly-reflected energy reappears at the input of converter 91. None of the energy reflected from the wave guide 59 will appear in the *p* arm of the hybrid junction due to the balance between the *s* and *p* arms previously mentioned.

Ripples will form on the non-reflected incident voltage at the input of converter 91 as previously described and after being heterodyned to an intermediate frequency by the beating oscillator 92 and amplified by the preamplifier 93, are detected by detector 44. A test trace 61 is formed on the oscilloscope as described in connection with Fig. 1.

By detecting the ripples in the output of the converter, it is possible to amplify the signals at an intermediate frequency where gain is more readily obtainable. Further, if the converter 91 is constructed integrally with an intermediate frequency preamplifier as is sometimes done, the testing method illustrated utilizes this built-in gain. Also, in a multichannel system, although the input frequency of each converter will be different, the intermediate frequency outputs will be the same so that if it is necessary to add gain ahead of detector 44, a common amplifier or set of amplifiers can be used to test all of the channel converters.

The input return loss of an amplifier or any other high frequency device may be determined by the circuit arrangement shown in Fig. 7 whereas the output return loss of a converter or other high frequency device could be determined with the circuit arrangement of Fig. 1.

Although the invention has been described in connection with specific illustrative embodiments, other embodiments and modifications will readily occur to one skilled in the art without departing from either the spirit or scope of the invention so that the invention should not be deemed limited to the embodiments shown.

What is claimed is:

1. High frequency test apparatus for measuring the energy reflected from a high frequency device when connected in circuit with a source of high frequency energy, said test apparatus comprising a source of oscillatory energy, means to periodically sweep the frequency of said energy through a range including the operating frequency range of said device, means to apply at least a portion of said energy to said device, means for varying the phase of said reflected energy relative to the phase of the non-reflected energy as the said frequency of said energy is swept comprising an electrically long section of transmission line connected to said device and terminated at its end remote from said device in a known impedance mismatch whereby energy applied to said transmission line is reflected therefrom back to said device, means connected to the output of said device to combine the non-reflected energy with the reflected energy, and means to detect the wave form of the combined energy.

2. The combination in accordance with claim 1 wherein said known impedance mismatch comprises a short circuit.

3. The further combination in accordance with claim 1 wherein the physical length of said section of transmission line is such that its electrical length will change at least several wavelengths as said frequency is swept through said operating range.

4. The combination in accordance with claim 1 and comparison means, means to detect a portion of the output of said source of oscillatory energy, and means to apply said detected oscillatory energy and said detected wave form to said comparison means for comparison.

5. High frequency test apparatus which comprises a source of oscillatory energy, means to periodically sweep the frequency of said energy through a range including the frequency range of interest of a device to be tested, means to apply at least a portion of said energy to said device, a reflecting circuit connected to said device comprising an electrically long section of transmission line terminated at one end in a known impedance mismatch, means for applying a portion of the energy applied to said device to said reflecting circuit whereby said last-named portion of energy is reflected, at least in part, from said reflecting circuit back to said device, means to combine the direct energy applied to said device with the energy reflected from said section of transmission line, and means to detect the combined energy.

6. Means for determining the return loss of a high frequency device over a band of frequencies which comprises a source of oscillating energy, means to periodically sweep the frequency of said energy through a range including said band of frequencies, a first transmission path for applying at least a portion of said energy to said device whereby a portion of said applied energy is reflected from said device as a function of said return loss, a second transmission path connected in the path of said reflected energy and including an electrically long section of transmission line terminated at one end in a known impedance mismatch whereby said reflected energy is re-reflected from said terminated section of transmission line, means for combining the non-reflected energy applied to said device with the energy reflected from both said device and said transmission line and means for recovering the resultant low frequency variation in said combined energy.

7. Apparatus for determining the output return loss of a high frequency device which comprises a source of oscillatory energy, means to periodically vary the frequency of said energy over a range including the operating frequency range of said device, means to apply at least a portion of said energy to the input of said device, detection means, a first transmission path connecting the output of said device to the input of said detection means, and a second transmission path connecting the output of said device to the input of said detection means comprising an electrically long section of transmission line terminated at one end in a known impedance mismatch, means to apply a portion of the output of said device to said section of transmission line, means to apply at least a portion of the energy reflected by said transmission line section to the output of said device, and means to apply at least a portion of the energy reflected from the output of said device to said detection means.

8. The combination in accordance with claim 7 wherein said electrically long section of transmission line terminated at one end in a known impedance mismatch comprises a section of hollow metallic wave guide whose electrical length will change at least several wavelengths as said frequency is varied over said operating range and which is short-circuited at one end.

9. The combination in accordance with claim 7 and a cathode-ray oscilloscope having horizontal and vertical deflecting means, means to apply the output of said detection means to one of said deflecting means, and a source of alternating voltage synchronized with said first-named means connected to the other of said deflecting means.

10. The combination in accordance with claim 9 and means to detect at least a portion of the output of said last-named detection means to said ouput of said last-named detection means to said one of said deflecting means alternately with the output of said first-named detection means.

11. Apparatus for determining the input impedance mismatch of a high frequency device over a band of frequencies which comprises a source of oscillating energy, means to periodically vary the frequency of said energy through a range including said band of frequencies, means to apply at least a portion of said energy to the input of said device whereby a portion of said applied energy is reflected from said input due to said impedance mismatch, an electrically long section of transmission line terminated at one end in a known impedance match, means to apply at least a portion of the said reflected energy to said section of transmission line whereby said reflected energy is re-reflected from said terminated transmission line, means to re-apply at least a portion of said re-reflected energy to said input, and means connected to the output of said device to recover the low frequency variations in the energy appearing in said output.

12. High frequency test apparatus for obtaining an indication of the amount of energy which will be reflected from the terminals of a high frequency device when connected in circuit with a source of energy, said apparatus comprising a source of high frequency energy, means to periodically vary the frequency of said energy through a range including the operating range of said device to be tested, means to apply at least a portion of said energy to said device, means to combine energy reflected from said terminals with applied energy which is non-reflected from said device, means to vary the phase relation between said reflected energy and said non-reflected energy as said frequency is varied through said operating range, and means to recover the low frequency amplitude variations of said combined energy.

13. The method of determining the return loss of high frequency apparatus which comprises the steps of applying to said apparatus a signal periodically varying in frequency over a range including the operating range of the apparatus, varying the phase of the energy reflected from said device relative to the phase of the applied non-reflected energy as said frequency varies, combining said reflected energy with a portion of the non-reflected signal applied to said device, and detecting the resultant wave form.

14. The method of measuring the return loss at a pair of terminals of a four-terminal high frequency device over a band of frequencies while said device is handling power levels of the same order as it will in normal operation, said method comprising the steps of applying to the device a signal swept in frequency over a range including said band, recovering energy reflected from said pair of terminals and re-reflecting said reflected energy back to said device, combining applied non-reflected energy with said re-reflected energy, varying the phase of said re-reflected energy relative to the phase of said non-reflected energy as the frequency of said signal is swept over said range, and detecting the amplitude variations in said combined energy.

15. The method of measuring the return loss of the output of a high frequency device which comprises the steps of applying to said device a signal whose power level is on the order of the power level of signals handled by said device in normal operation, reflecting a portion of the output of said device back to said output, recovering the reflected energy which is re-reflected from said output and comparing the power level of the said re-reflected energy with the power level of the output of said device which is non-reflected.

16. The method in accordance with claim 15 which includes the steps of sweeping the frequency of the applied signal over a range including the pass band of said device, varying the phase of the re-reflected energy relative to the phase of said output energy which is non-reflected as a function of said sweeping and combining said re-reflected energy with said output energy which is non-reflected, whereby ripples are produced whose amplitudes are functions of said return loss.

17. The method of determining the return loss at a pair of terminals of a four-terminal high frequency device which comprises the steps of applying to said device a signal whose power level is on the order of the power level of signals normally handled by said device, utilizing the applied signal as the test signal by reflecting a portion of the applied signal back to said pair of terminals and measuring the power level of the reflected energy which is re-reflected from said pair of terminals relative to the applied energy which is non-reflected.

18. The method of measuring the return loss of a high frequency device which comprises the steps of applying to said device a high frequency signal whose power level is on the order of power levels normally handled by said device, whereby a portion of said energy is reflected from said device due to impedance discontinuities, combining the reflected energy with applied energy which is non-reflected, and producing ripples on said applied non-reflected energy whose amplitudes are functions of said return loss by sweeping the frequency of said applied energy over a range including at least a substantial fraction of the pass band of said device, and varying the phase of said reflected energy relative to the phase of said non-reflected energy as said frequency is swept.

19. The method in accordance with claim 18 and the steps of detecting said ripples and visually displaying said detected ripples.

20. The method of determining the input impedance mismatch of a high frequency device which comprises applying to the input of said device a normal level signal whose frequency is swept over a range including the normal operating frequency range of the device, reflecting a portion of the energy reflected from the input of said device back to said input, and measuring the low frequency amplitude variations in the output voltage of said device.

21. Apparatus for simultaneously determining the input impedance mismatch and the transmission characteristic of a high frequency device over a band of frequencies which comprises a source of oscillating energy, means to sweep the frequency of said energy through a range including said band, means to apply at least a portion of said energy to the input of said device, an electrically long section of transmission line connected to receive energy reflected from the input of said device, said section of transmission line terminated at its end remote from said input by a predetermined impedance mismatch, means to apply a portion of the energy reflected from said section of transmission line to the input of said device, visual voltage amplitude indicating means, means to recover the low frequency amplitude variations in the output voltage of said device, and means to apply said recovered amplitude variations to said visual indicating means.

22. The combination in accordance with claim 21 and means to detect the low frequency amplitude variations in a sample of the output of said source and means to apply said last-named amplitude variations to said visual indicating means alternately with said first-named recovered amplitude variations.

23. High frequency testing apparatus for determining the return loss over a band of frequencies of a pair of terminals of a high frequency device having input and output terminals, said testing apparatus comprising a source of oscillatory energy, means for sweeping the frequency of said energy through a frequency range including said band, means for applying said energy to the input terminals of said device, an electrically long reflecting circuit connected at one end to said pair of terminals and terminated at the other end in a known impedance mismatch, circuit means connected to the output of said device for combining the direct energy applied to said device with the energy reflected by said reflecting circuit, a detector, means for applying said combined energy to the input of said detector, and an indicating circuit connected to the output of said detector.

24. Apparatus for determining the output return loss of a high frequency device over a band of frequencies which comprises a source of high frequency energy, means for sweeping the frequency of said energy through a frequency range including said band, means for applying said energy swept in frequency to the input of said device, means connected to the output of said device for reflecting a portion of the output of said device back to said output, means also connected to the output of said device for recovering the said reflected energy which is re-reflected from said output, and means for comparing the power levels of said re-reflected energy with the applied energy in said output which is non-reflected.

FREDERICK E. RADCLIFFE.

References Cited in the file of this patent

UNITED STATES PATENTS

| Number | Name | Date |
|---|---|---|
| 2,252,058 | Bond | Aug. 12, 1941 |
| 2,380,791 | Rosencrans | July 31, 1945 |
| 2,532,736 | Sheppard | Dec. 5, 1950 |
| 2,534,957 | Delvaux | Dec. 19, 1950 |
| 2,545,544 | Doherty | Mar. 20, 1951 |
| 2,562,281 | Mumford | July 31, 1951 |
| 2,573,402 | Chapman | Oct. 30, 1951 |